(12) United States Patent
Fijas et al.

(10) Patent No.: US 7,121,102 B2
(45) Date of Patent: Oct. 17, 2006

(54) PRECOOLER/CHILLER/REHEATER HEAT EXCHANGER SYSTEM FOR PROVIDING WARM DRIED AIR

(75) Inventors: David F. Fijas, Depew, NY (US); Timothy J. Galus, Hamburg, NY (US)

(73) Assignee: API Heat Transfer, Inc., Buffalo, NY (US)

( * ) Notice: Subject to any disclaimer, the term of this patent is extended or adjusted under 35 U.S.C. 154(b) by 203 days.

(21) Appl. No.: 10/879,224

(22) Filed: Jun. 29, 2004

(65) Prior Publication Data

US 2005/0284157 A1    Dec. 29, 2005

(51) Int. Cl.
*F25D 17/06*    (2006.01)

(52) U.S. Cl. ............................ 62/93; 62/513
(58) Field of Classification Search ............ 62/93, 62/95, 434, 513
See application file for complete search history.

(56) References Cited

U.S. PATENT DOCUMENTS

| | | | | |
|---|---|---|---|---|
| 2,632,315 A | * | 3/1953 | Coblentz | 62/271 |
| 3,585,808 A | * | 6/1971 | Huffman | 62/93 |
| 4,235,081 A | * | 11/1980 | Dowling | 62/93 |
| 4,237,696 A | * | 12/1980 | Coblentz | 62/93 |
| 4,359,879 A | * | 11/1982 | Wright | 62/513 |
| 5,228,504 A | | 7/1993 | Mantegazza | |
| 5,275,233 A | | 1/1994 | Little | |
| 5,845,505 A | * | 12/1998 | Galus et al. | 62/95 |

* cited by examiner

*Primary Examiner*—Melvin Jones
(74) *Attorney, Agent, or Firm*—Jaeckle Flesichmann & Mugel, LLP

(57) ABSTRACT

A precooler/chiller/reheater (PCR) system comprising a precooler/reheater counterflow heat exchanger and a chiller counterflow heat exchanger separated by a moisture removal section. Refrigerant is flashed through a perforated distribution manifold along the plates of the chiller. Warm, moist air is precooled in the precooler/reheater heat exchanger. A manifold conveys the precooled air to the chiller heat exchanger. Chilled air exits the chiller at a low point in the system. Moisture condensed in the precooler and chiller drains into a sump that also acts to convey air into the moisture removal section. Water droplets are stripped from the airflow and drain downwards into the sump. The chilled and dried air is conveyed to the second side of the precooler/reheater heat exchanger and passes downward in counterflow to the direction of air entering the system on the first side of the heat exchanger, then exits the system ready for use as reheated, dried air.

18 Claims, 8 Drawing Sheets

PRECOOLER/CHILLER/REHEATER HEAT EXCHANGER SYSTEM FOR PROVIDING WARM DRIED AIR

TECHNICAL FIELD

The present invention relates to the art of heat transfer; more particularly, to heat exchangers for use in refrigerated air drying; and most particularly to a precooler/chiller/reheater ("PCR") system having an improved layout for one-step brazing of combined plate assemblies, easy scalability, improved operating efficiency, and reduced manufacturing cost.

BACKGROUND OF THE INVENTION

Refrigerated air driers are well known in the art of air conditioning. In a refrigerated air dryer system, warm, moist air such as from the interior of a factory, and which typically is compressed, is cooled and dried and then conveyed to a location where it is used. In such a compressed air system, it is important to reduce the water content of the compressed air before delivering the compressed air to the points of use to avoid condensation of moisture upon adiabatic decompression. This is known in the prior art to be accomplished by using air- or water-cooled aftercoolers, moisture separators, and air dryers. Air dryers are available in many different types, and the present invention is illustrated with a non-cycling direct expansion refrigerated air dryer wherein the compressor operates continuously. This type of air dryer effectively reduces water content in compressed air by physically chilling the compressed air directly with a refrigeration circuit and thus reducing the capacity of the compressed air to hold water vapor. Water vapor in the chilled compressed air condenses as liquid droplets as the temperature of the compressed air is lowered to a desired dew point, typically about 40° F. The combination of chilled air and water droplets flows through a moisture separator that mechanically removes the droplets from the air stream.

It is further desirable to reheat, or "temper," the dried air to lower the relative humidity and thereby prevent formation of condensation at the use point, and also to prevent atmospheric condensation on compressed air piping within the factory, as might occur if the chilled dried air were piped directly without insulation.

The main components in this type of refrigerated air dryer are a refrigeration system, a moisture separator, and two air heat exchangers.

The first of these heat exchangers is a precooler/reheater. It precools warm saturated compressed air from an air compressor aftercooler by transferring heat to chilled air that is being returned from the moisture separator. One benefit of this heat exchanger is that it reduces some of the cooling load that the refrigeration system would otherwise have to handle in subsequent dehumidification of the air. The refrigeration system becomes smaller, requiring less power for thriftier operation. The precooler/reheater heat exchanger is also known in the art as the "economizer" because of this benefit. Another benefit offered by this first heat exchanger is that it reheats the chilled air coming from the moisture separator, as described below. As noted above, reheating the chilled air reduces the chances that low ambient conditions can cause condensation in the air line downstream of the dryer and also reduces the likelihood of pipeline condensation or "sweating" that can occur on chilled surfaces in humid use conditions downstream of the PCR system.

The second heat exchanger is a refrigerant-to-air chiller that takes the precooled air from the first heat exchanger and chills it to the desired dewpoint temperature by transferring heat from the air into a cold refrigerant on the other side of the heat exchanger, thereby causing condensation of water from the air. After being thus chilled, the air enters a moisture separator to remove any remaining condensed water, and then the air is returned to the cold side of the first heat exchanger for reheating and exit from the PCR.

U.S. Pat. No. 5,845,505 and No. 6,085,529 disclose PCRs that function substantially as just described, and the relevant disclosures of these patents are herein incorporated by reference.

A prior art PCR in accordance with these disclosures comprises a precooler/reheater heat exchanger, also known as a precooler and reheater core, and a chiller heat exchanger, also known as a chiller core, in adjacent relation. Warm compressed air is passed through the precooler/reheater heat exchanger, and then directly through the chiller heat exchanger serially in a first direction, and then through a moisture separation means wherein water condensed in the chiller heat exchanger is collected and drained. The dried, cooled air is collected and directed via a return manifold to pass through the reheater side of the precooler/reheater heat exchanger in a second direction substantially perpendicular to the first direction.

Such a prior art PCR, although functionally effective, is relatively costly to manufacture and is not readily scalable using modular components, for the following reasons:

The prior art PCR design requires that the precooler/reheater core sections and the chiller core sections be stacked and brazed in two separate operations. After brazing is completed, manifolds are welded to the individually brazed cores, and then the individual cores and moisture separator sections are welded together to complete the assembly. What is needed in the art is an arrangement wherein all three sections may be stacked and brazed efficiently in one sub-assembly.

The prior art PCR requires a large and complex return manifold to direct the compressed air flow from the moisture separation section to the reheater section. This manifold is typically a large and complex aluminum casting, the size of which cannot be readily altered to accommodate larger or smaller capacity heat exchangers as may be desired for various end-use applications. What is further needed in the art is a simple, straight manifold, preferably formed of off-the-shelf stock, which may be easily shortened or lengthened to accommodate heat exchangers of greater or lesser capacity.

The prior art PCR employs a five-piece refrigerant inlet manifold assembly to direct refrigerant flow into the chiller. An associated refrigerant system must include an expansion device such as a thermo-expansion valve or capillary tubes. What is further needed in the art is an inlet manifold assembly wherein chilled liquid refrigerant is both flashed and distributed into the chiller heat exchanger without resort to other expansion devices.

The prior art PCR employs cross-flow directions in both the precooler/reheater heat exchanger and the chiller heat exchanger. It is known that counter-flow heat exchangers can be more efficient and provide more uniform temperature profiles in the fluids within the heat exchangers. This is especially important in the refrigerant side of the chiller, as it is more likely to provide uniformly superheated refrigerant vapor exiting the chiller, thereby reducing the likelihood that any liquid refrigerant can leave the chiller and enter the refrigerant compressor downstream, and thereby improving the overall control of the air dryer operation. What is further needed in the art is a PCR wherein all heat exchange is performed in a counter-flow fashion.

The prior art PCR has the precooler/reheater heat exchanger in mechanical contact with the chiller heat exchanger along their mutual length, allowing heat transfer therebetween which compromises the thermal efficiency of both and increases the thermal load on the refrigerant system. What is needed in the art is a means for insulating the precooler/reheater heat exchanger from the chiller to allow an air dryer manufacturer to reduce the capacity and cost of the appropriate refrigeration system for drying capacity of a given air dryer system.

The prior art PCR uses means for moisture separation, including a mesh pad inserted next to the chiller to capture and coalesce much of the condensed water leaving the chiller. Also, the return manifold is used to reduce the vertical upward velocity of the air flow and allow gravity to separate out any remaining droplets leaving the mesh pad. The manifold must be large enough to accommodate the mesh pad and also to reduce the upward air velocity sufficiently to prevent carryover of water into the reheater. Because the air within the PCR is compressed typically to 100 psig or more, the manifold, being of irregular shape not optimized for burst resistance, must be formed with very thick, heavy walls reinforced by internal bars. What is needed in the art is an air flow pathway and apparatus wherein condensate is readily removed without requiring a large, heavy, and expensive manifold.

It is a primary object of the invention to provide a precooler/chiller/reheater system having counterflow heat exchangers that is readily adaptable to various sizes and capacities of air flow and heat exchange.

SUMMARY OF THE INVENTION

Briefly described, an improved precooler/chiller/reheater system in accordance with the invention comprises a first precooler/reheater heat exchanger and a chiller heat exchanger separated by a moisture removal section. All fluid flows are parallel to the physical contact between these units, such that fluid flows through the heat exchangers are counter-flow. A refrigerant source provides liquefied refrigerant to the chiller heat exchanger, wherein the refrigerant is flashed through a perforated distribution manifold along the plates of the heat exchanger to form an adiabatically-chilled liquid/gas mixture. In a currently preferred embodiment, the liquefied refrigerant is passed through a portion of the chilled air pathway to reduce the temperature of the refrigerant prior to its being flashed by the distribution manifold.

Warm, moist air enters the precooler/reheater heat exchanger at a first end and exits at a second end. A first manifold conveys the precooled air to a first end of the chiller heat exchanger.

Precooled air and condensate formed in the precooler enters the chiller heat exchanger at a first end and exits at a second end, which preferably is at or near a low point in the system. Moisture is condensed from the air in the chiller heat exchanger and drains therefrom by gravity into a sump. Water flow is assisted by the downward passage of the air through the chiller.

The sump also functions as a second manifold to convey air into the moisture removal section between the two heat exchangers wherein the air passes upwards. Entrained water droplets are coalesced and stripped from the airflow and drain downwards into the sump. An inverted weir between the chiller and the moisture removal section enhances moisture collection and reduces the tendency for moisture draining from the chiller core to encroach into the moisture removal section.

The chilled and dried air passes out the top of the moisture removal section into a third manifold wherein the air is conveyed to an entrance to the opposite side of the precooler/reheater heat exchanger. The chilled, dry air passes through the precooler/reheater heat exchanger, preferably in a downward direction from top to bottom in counterflow to the direction of the warm, moist air entering the system on the first side of the heat exchanger, and exits the system ready for use as tempered, dried air.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
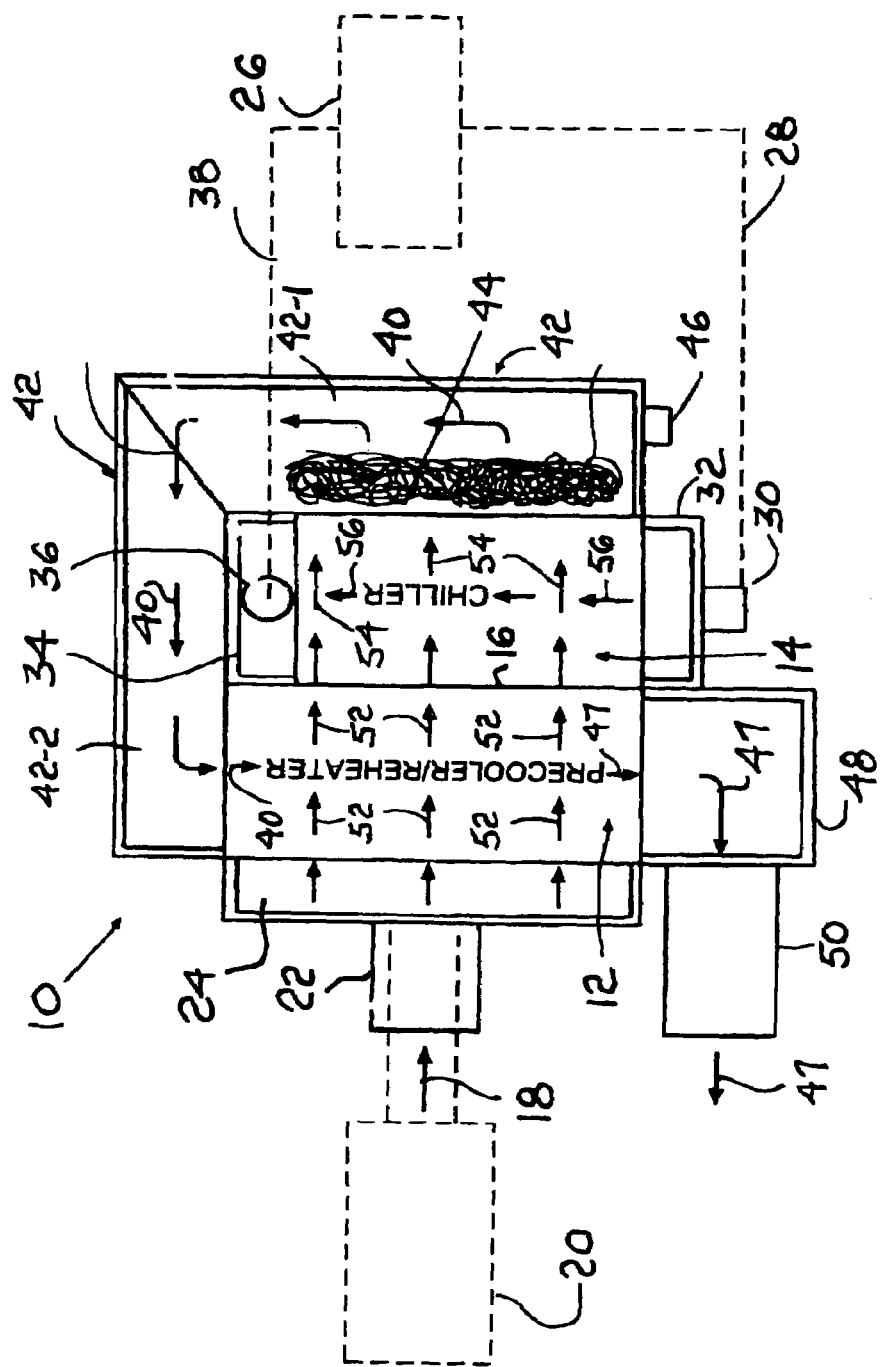
FIG. 1 is a schematic diagram showing fluid flow in a prior art PCR system substantially as disclosed in U.S. Pat. No. 6,085,529.
Figure 2:
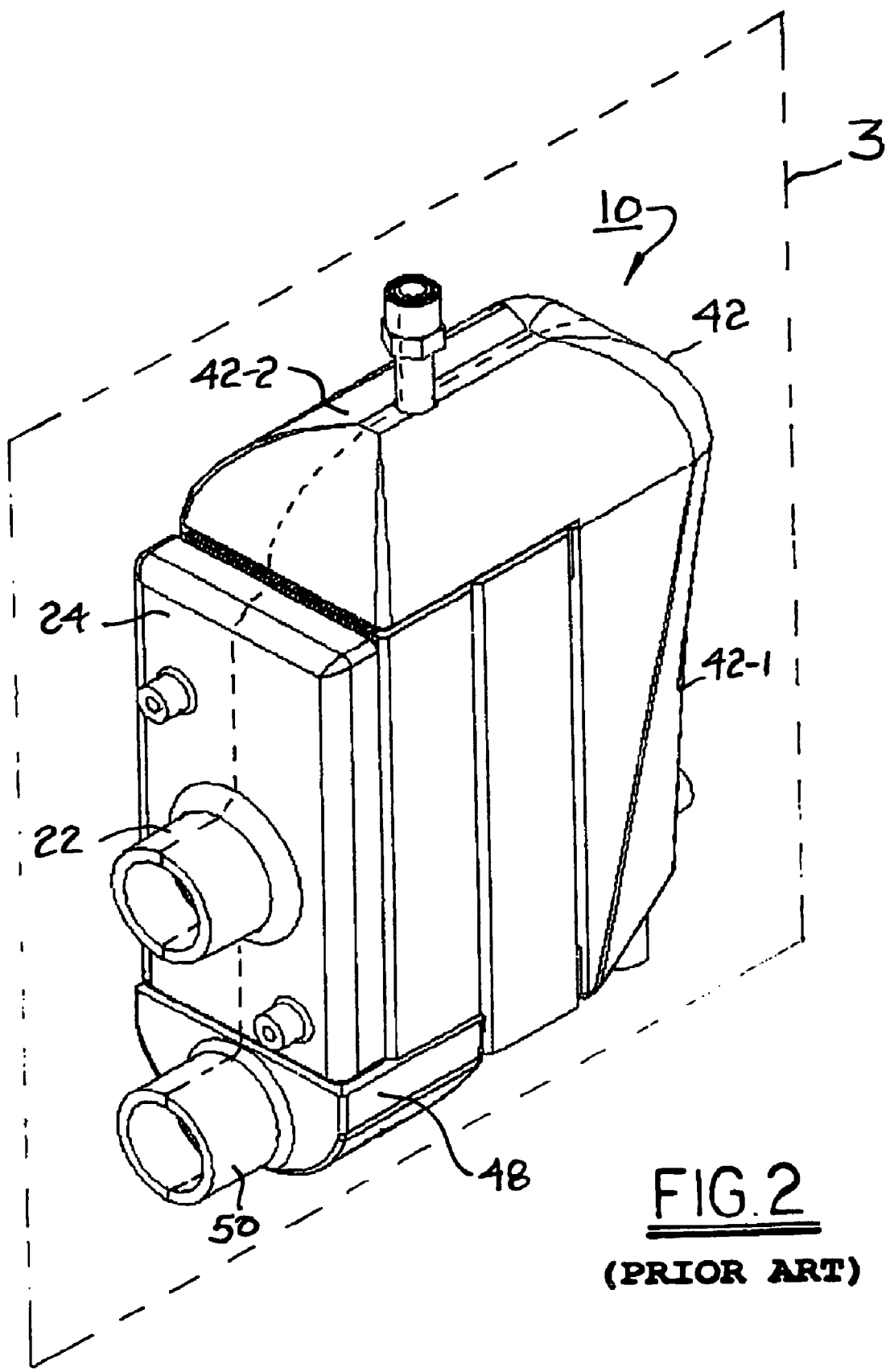
FIG. 2 is an isometric view of an embodiment of a prior art PCR system consistent with the schematic flow diagram shown in FIG. 1.
Figure 3:
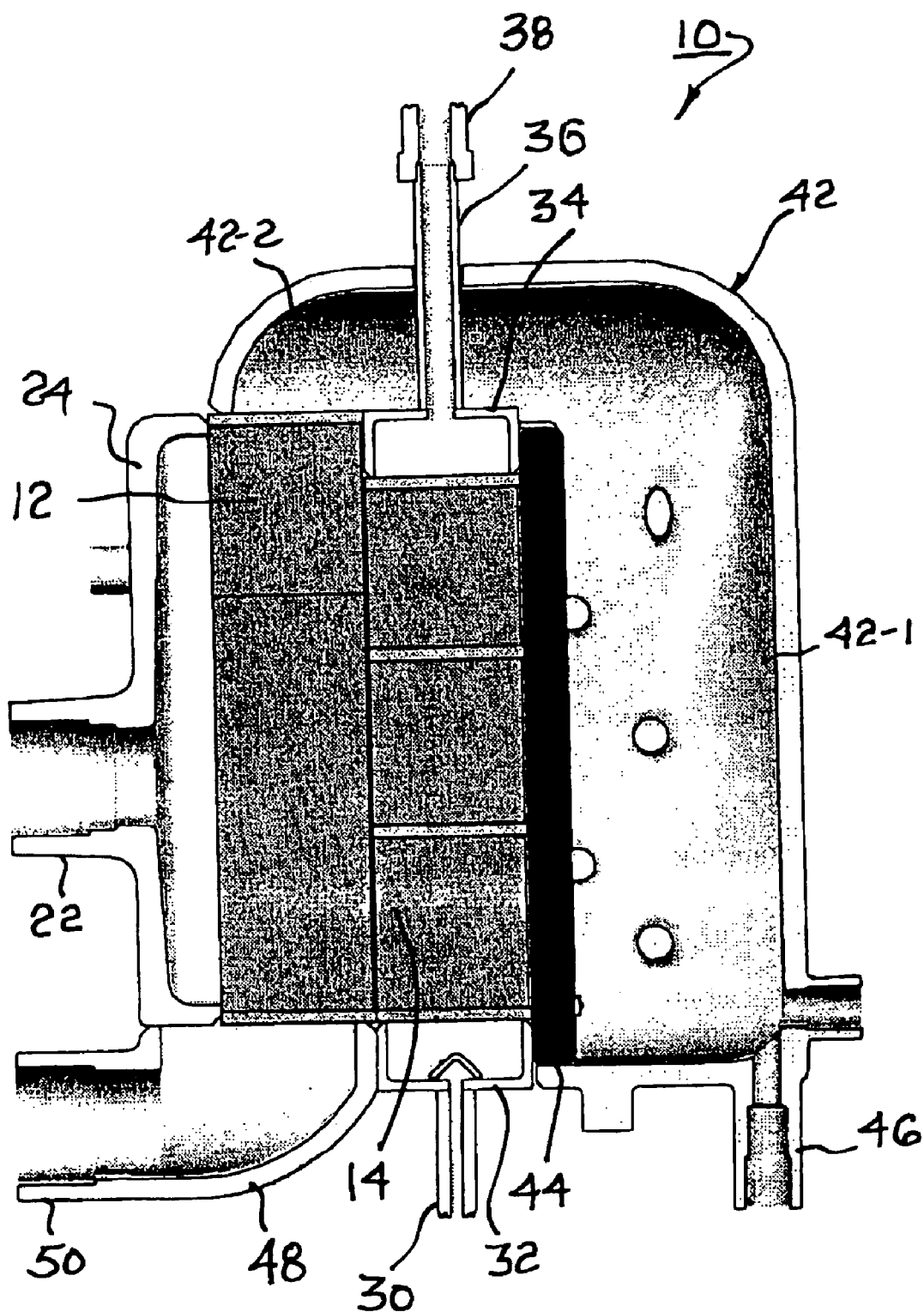
FIG. 3 is an elevational cross-sectional view taken along plane 3 in FIG. 2.

Referring to FIGS. 1 through 3, a prior PCR system 10 is presented substantially as disclosed in incorporated U.S. Pat. No. 6,085,529. PCR system 10 includes a precooler/reheater core 12 and chiller core 14 abutting along interface 16. System 10 is shown as it would appear in a refrigerated air dryer system for handling ambient air from either interior or exterior locations. Warm moist air 18 from the discharge of an air compressor aftercooler 20 enters core 12 of PCR system 10 through an inlet fitting 22 and a manifold 24. Coolant or refrigerant from a source 26 including a compressor is supplied to chiller core 14 via a line 28, inlet fitting 30, and manifold 32. Refrigerant is returned from core 14 via a manifold 34, outlet fitting 36, and line 38. Chilled air 40 leaving chiller core 14 is conducted to precooler/reheater core 12 by manifold means generally designated 42 having a first section 42-1 contiguous with chiller core 14 and a second section 42-2 contiguous with both chiller core 14 and precooler/reheater core 12. In the arrangement shown, the sections 42-1 and 42-2 are disposed at substantially right angles to each other. First section 42-1 of manifold means 42 is in fluid communication with heat transfer passages (not shown) of chiller core 14 along substantially the entire vertical length of chiller core 14 as viewed in FIGS. 1 and 3. Second section 42-2 of manifold means 42 has an outlet in fluid communication with heat transfer passages (not shown) of precooler/reheater core 12 and at the upper end of core 12 as viewed in FIGS. 1 and 3. System 10 is oriented so that manifold section 42-1 is disposed generally vertically and manifold section 42-2 is disposed generally horizontally and is located above the cores 12 and 14.

There is provided a moisture separator in the form of a demister mesh pad 44 in manifold section 42-1, preferably extending along the junction between the passages of core 14 and the interior of manifold section 42-1. A condensate drain 46 at the lower end of manifold section 42-1 serves to remove separated moisture which drips from pad 44 by gravity.

Demoisturized and reheated air 47 leaves precooler and reheater core 12 via a manifold 48 and an outlet 50 which is connected by a conduit (not shown) to a location of use of the processed air.

The path of air traveling through PCR system 10 is indicated by the arrows in FIG. 1. The portion 52 of the path is through the stacked arrangement of heat transfer passages in core 12 in heat exchange relationship with the alternating stack of heat transfer passages through which the chilled air 40 from core 14 passes. The portion 54 of the path is through the stacked arrangement of heat transfer passages in chiller core 14 which are in the alternating relationship with the series of stacked heat transfer passages which convey refrigerant in the direction of arrows 56. Thus, the flows of precooled air 54 and refrigerant 56 in chiller core 14 are in a cross flow, i.e., substantially perpendicular, relationship. Chilled air leaving core 14 is conveyed to core 12 by manifold means 42. Chilled air 40 flows along the stacked arrangement of heat transfer passages in core 12 which are in heat exchange relationship with the alternating stacked arrangement of heat transfer passages through which the warm, moist incoming air 18/52 flows. Thus, the flows of warm, incoming air and chilled air in core 12 are in a cross flow, i.e., substantially perpendicular, relationship. Chilled air 40 while in core 12 gains some heat from the warm moist air 18/52 entering PCR system 10. This provides a precooling function to improve the overall efficiency and also simultaneously results in the dehumidified air being tempered by reheating for its ultimate use.

Prior art PCR system 10 relies upon low exit face air velocity from the chiller core 14 to incorporate integral separation of condensate from air. Some droplet separation occurs in the heat transfer matrix of cores 12 and 14. Wire demister mesh pad 44 mounted flush with the air side exit face of the chiller core 14 is intended to remove any remaining droplets suspended in the air flow; however, in practice droplets exiting the core and mesh near the top of the core may be carried over into the precooler/reheater core 12, thus reducing the efficiency of the apparatus. It is both difficult and expensive to make manifold 42 large enough that tiny moisture droplets can settle by gravity rather than being carried over into reheater core 12.

Figure 4:
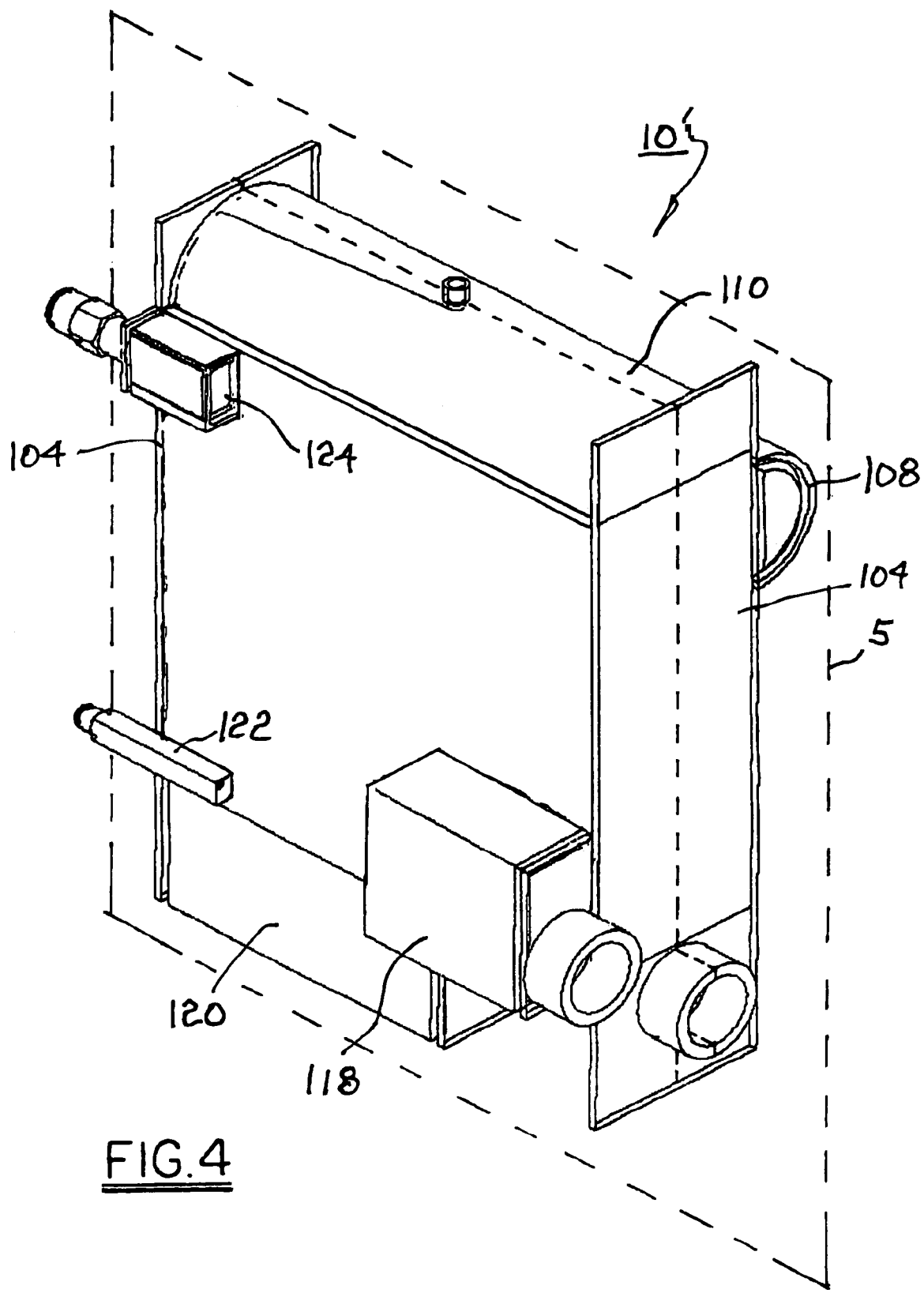
FIG. 4 is an isometric view from above of a first embodiment of an improved PCR system in accordance with the invention.
Figure 5:
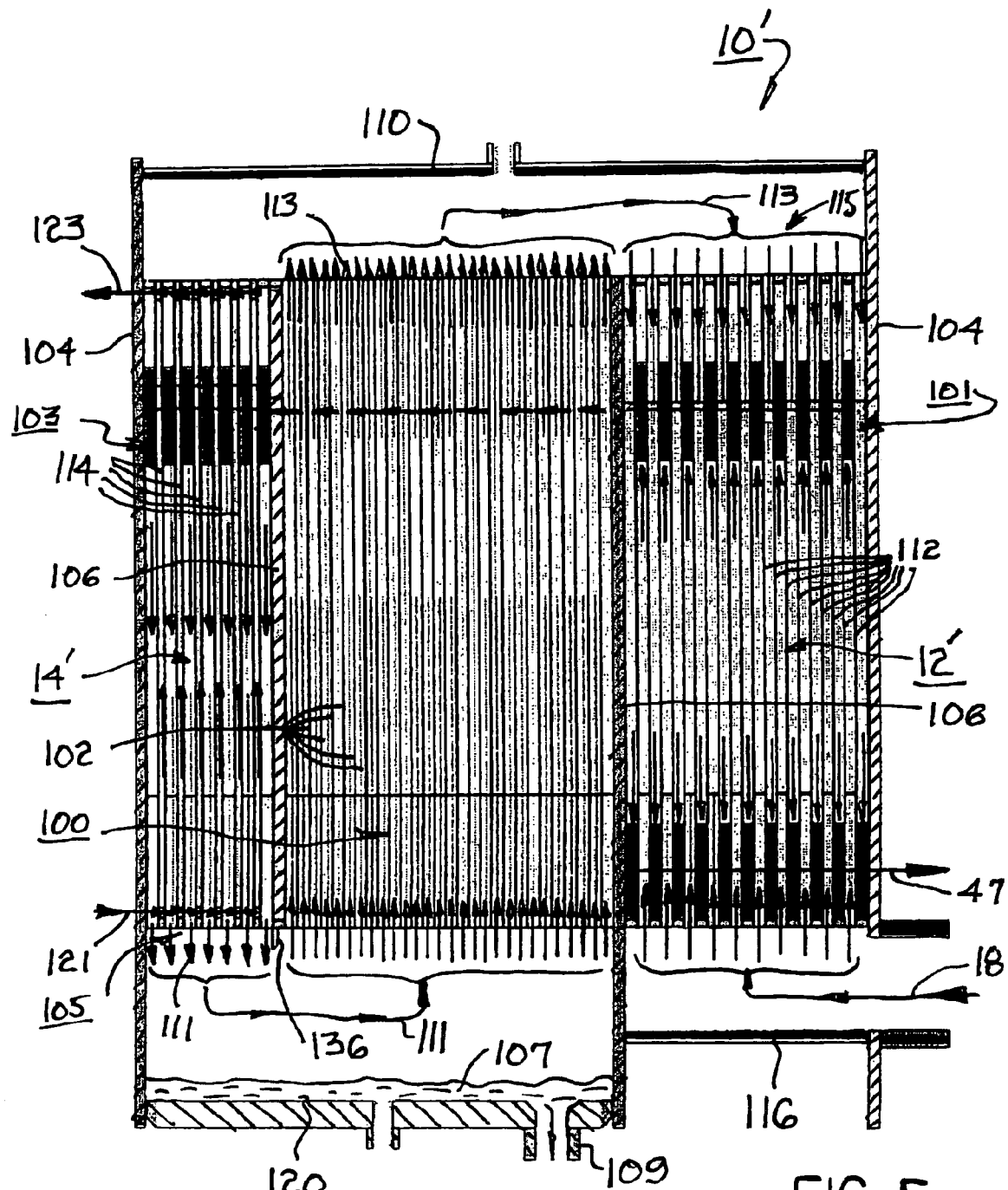
FIG. 5 is an elevational cross-sectional view taken along plane 5 in FIG. 4.

Referring to FIGS. 4 and 5, an improved PCR system 10' in accordance with the invention comprises a precooler/reheater core 12' and a chiller core 14' separated by a moisture separation section 100. The cores 12',14' are laid up like conventional heat exchangers of alternatingly connectable plates 112,114, respectively, formed preferably of aluminum in known fashion, such that materials passing through the cores on opposite sides thereof travel in opposite directions, i.e., in counter-flow. The moisture separation section 100 is disposed between cores 12',14', providing thermal separation thereby, and comprises a plurality of spaced-apart plates 102 providing a very large surface for coalescence and accumulation of water droplets at low air velocities. Preferably, plates 102,112,114, end frames 104, and internal frames 106 are sized such that the entire assembly, as shown especially in FIG. 5, may be laid up and then brazed in a single step in a conventional brazing oven (not shown). Also included between end frames 104 is a moisture separator-to-reheater (second crossover) manifold 110. Additional elements include an air inlet manifold 116, precooler-to-chiller (first crossover) air manifold 108 (shown in FIG. 4 but not visible in FIG. 5), an air outlet manifold 118, a sump 120, a flashing refrigerant distributor 122, and a refrigerant collector 124. To be fully operational, system 10' obviously requires a conventional refrigerant source compressor, similar to source 26 shown in FIG. 1 but omitted from FIGS. 4 and 5 for clarity, for receiving spent refrigerant 123 from collector 124 and supplying compressed refrigerant 121 to distributor 122.

Figure 6:
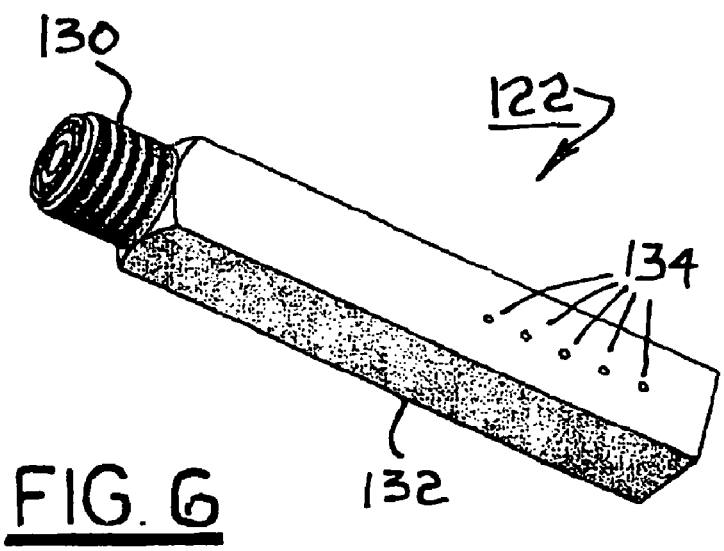
FIG. 6 is an isometric view of a flashing refrigerant distributor for use in a PCR system in accordance with the invention.
Figure 7:
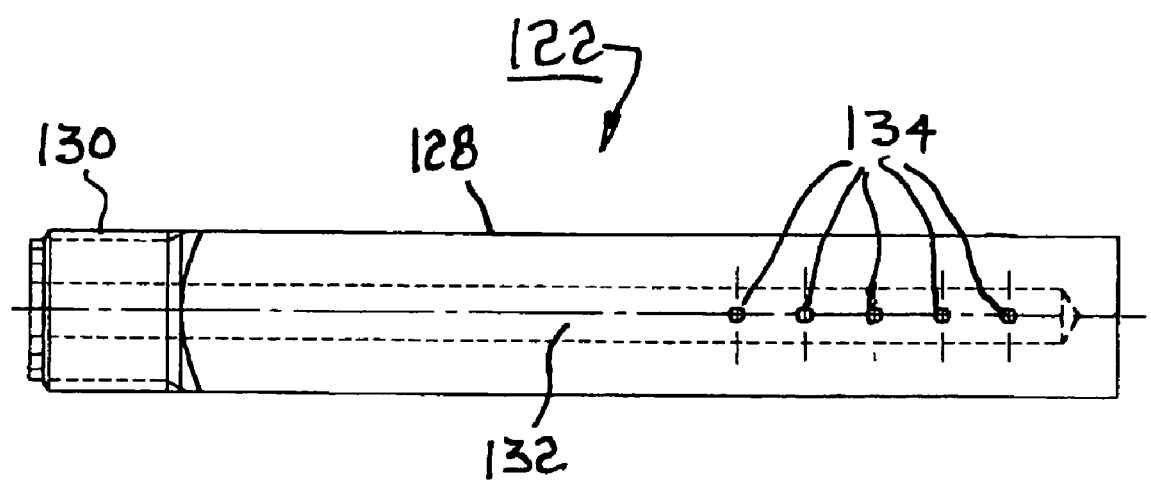
FIG. 7 is a longitudinal view of the distributor shown in FIG. 6.

Referring to FIGS. 6 and 7, flashing refrigerant distributor 122 comprises a generally rectangular body 128 suitable for attachment to core 14' as by welding. Distributor 122 is provided with means 130, for example threads as shown in FIG. 6, for attachment to a source (26) of pressurized, liquid refrigerant. A blind axial bore 132 extends within body 128, and a plurality of transverse radial bores 134 in body 128 intersect bore 132. An individual bore 134 is provided for each cooling passage in core 14', and distributor 122 is oriented such that refrigerant flow from bores 134 is directed into core 14'. The diameter of bores 134 is selected to cause a predetermined pressure drop such that the pressurized, liquid refrigerant flashes from the liquid phase to the gas phase as it passes into the cooling passages of core 14', thereby obviating the need for a capillary or thermal expansion valve for flashing as is known in the prior art. If desired, the diameters of various of radial bores 134 may be varied to compensate for pressure drop along axial bore 132 such that flows from radial bores 134 are equalized. The angle of intersection between radial bores 134 and axial bore 132 may also be varied to compensate for the pressure drop as well. Axial bore 132 may have side walls of a constant diameter, as shown in FIG. 7, or the walls may be tapered or stepped to further control the pressure drop of the refrigerant across the length of distributor 122.

In a preferred operating orientation, system 10' is preferably oriented with manifold 110 at the top and sump 120 at the bottom, as shown in FIGS. 4 and 5. This orientation optimizes separation of moisture droplets from the airflow at the lower end of chiller core 14' and throughout moisture separation section 100, and conveniently permits accumulation of separated moisture in sump 120. In a further preferred embodiment, a dam or knife edge 136 extends downward into sump 120 between core 14' and section 100 to provide a preferred drip edge for condensation, preventing creep of condensate from core 14' into section 100.

Figure 8:
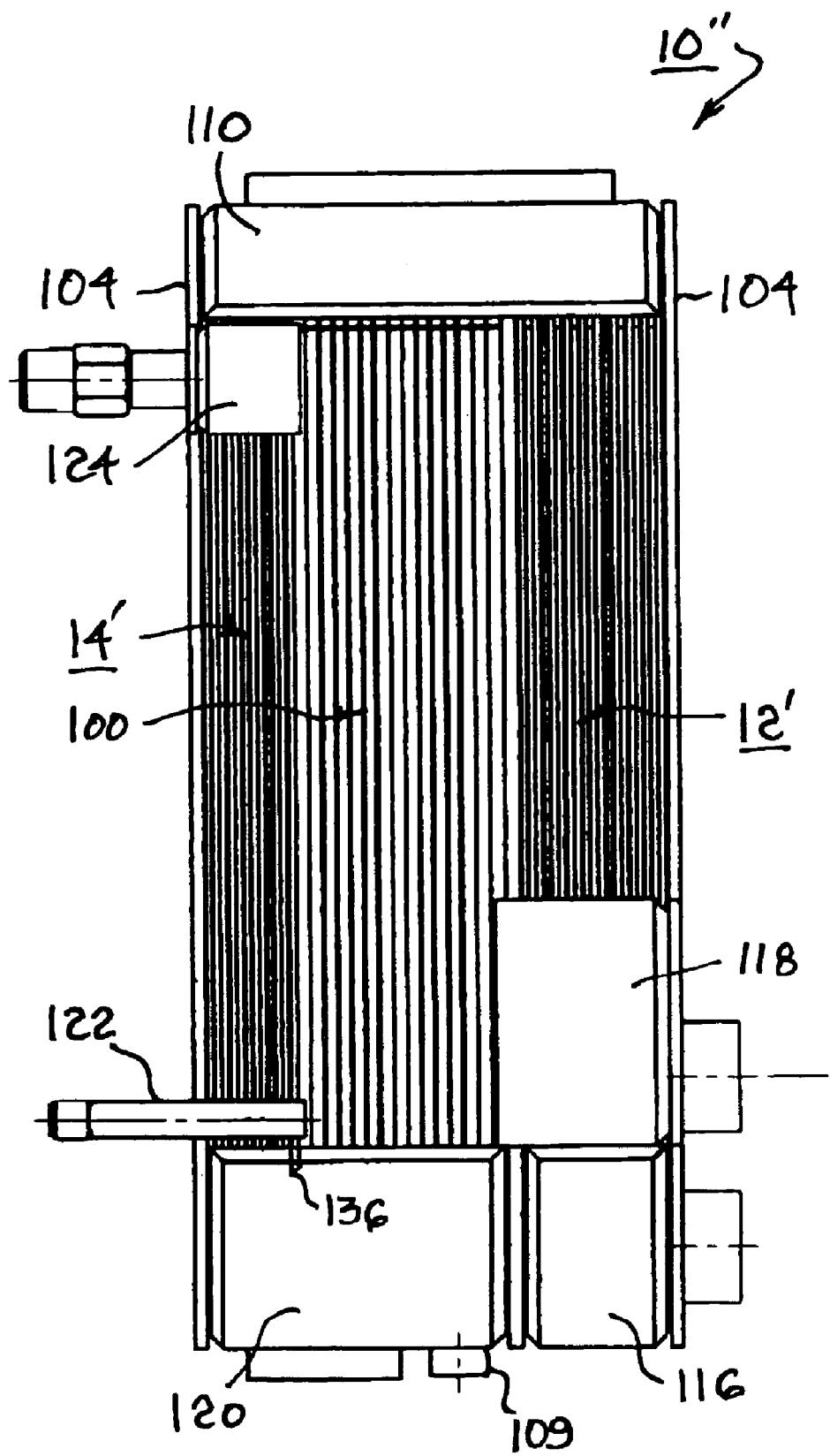
FIG. 8 is a front elevational view of a second embodiment of a PCR system in accordance with the invention, showing the core sections within.
Figure 9:
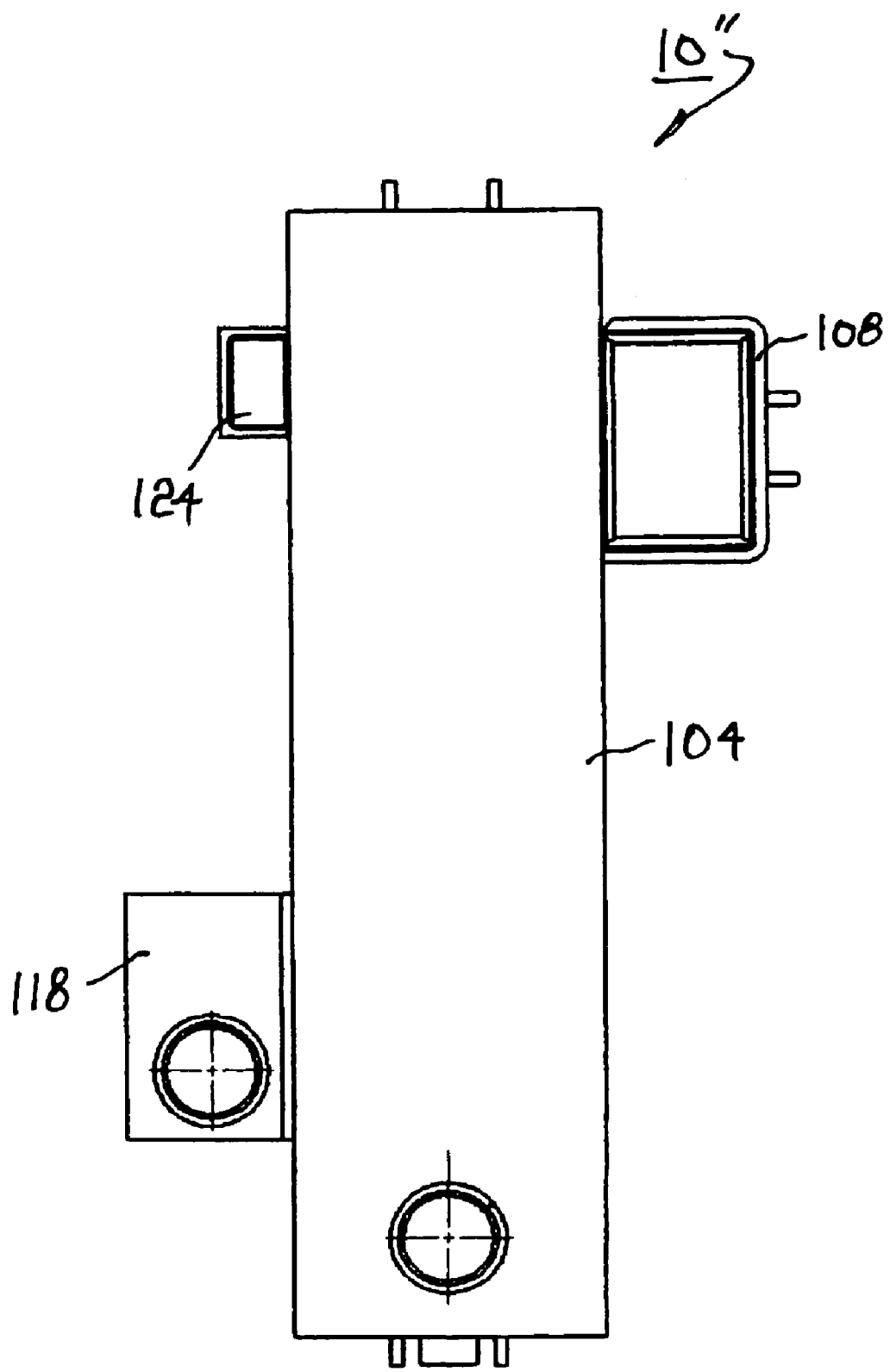
FIG. 9 is a side elevational view of the embodiment shown in FIG. 8, showing use of rectangular manifolds.

Referring now to FIGS. 4 through 9, forming the PCR system 10' as a stack of parallel plates and frames, while employing manifolds to guide the air being processed and the chiller refrigerant, provides several novel and significant benefits over prior art PCR systems:

1. The system may be conveniently sized to meet any specific air flow and dehumidification requirement by the addition or subtraction of plates from either of the heat exchangers 12',14' and/or the moisture separator 100 without requiring any change in end frames 104 or internal frames 106. See, for example, the difference in size between embodiment 10' (FIG. 5) and embodiment 10" (FIG. 8).

Because manifolds 108,110,116 may be readily fabricated from linear stock, such as rectangular stock (FIGS. 8 and 9) or hemi cylindrical stock (FIGS. 4 and 5), longer or shorter manifolds are readily and inexpensively provided, in contrast to prior art PCR system 10 (FIGS. 2 and 3) wherein the size of the precooler/reheater core 12 and the chiller core 14 define the size and shape of the encompassing manifold 42. Such facile sizing of improved system 10' permits fabrication of systems with minimal pressure drops throughout under use conditions, preferably 3 psi or less.

2. The principal structural elements of PCR system 10' may be laid up and braze-assembled in a single brazing step, whereas prior art PCR system 10 requires a plurality of separate brazing steps.

3. Flows through both core 12' and core 14' are counterflow, which provides the most uniform temperature profiles at the exits of cores 12',14' and also guards against liquid refrigerant being carried over into collector 124, whereas the corresponding flows through prior art system 10 are crossflow.

4. Moisture separation is highly efficient and is much improved over the prior art. Because of the counterflow arrangement and the orientation of system 10', all dehumidified air exits chiller core 14' at the lower end thereof and must then travel the entire length of section 100 upwards in order to reach the inlet to core 12', whereas in PCR 10 moisture droplets from the upper portions of chiller core 14 and mesh pad 44 are readily and undesirably entrained into manifold 42 and thence into core 12. Providing a large number of plates 102, and correspondingly large plate surface area, ensures that all water droplets are arrested and drained to the sump and that vertical air velocities through section 100 are insufficient to entrain water into core 12'.

In operation, warm, moist air 18 enters system 10' and is distributed into precooler/reheater heat exchanger 12' via manifold 116. Air 18 flows upward through core 12' and is turned via a mitered section (not visible) in core 12' such that air flow is directed sideways from core 12' through a core exit 101 into manifold 108. The partially-cooled air is conveyed by manifold 108 to a side entrance 103 in chiller core 14', is turned by another mitered section (not visible) to flow downwards through core 14' to an exit 105 into sump 120.

Compressed, liquid refrigerant 121 is supplied from a source (not shown) into distributor 122 at the lower end of core 14' whence the refrigerant flashes via bores 134 to a cooling gas/liquid mixture in known fashion. The flow rate and thermal load are adjusted preferably to provide a dew point of about 40° F. in the dried air 111 exiting core 14'. Cool gas/liquid mixture flows upwards in core 14' in counterflow to air 111. Air flowing downward in core 14' is cooled by heat exchange through plates 114. Condensed water 107 drains by gravity from core 14' into sump 120 and may be removed therefrom via drain port 109.

Air 111 is then directed upwards through moisture-removal section 100 wherein any residual moisture droplets are coalesced and returned by gravity to sump 120. Plates 102 may be provided with fins or other appendages (not shown) in known fashion to promote surface turbulence and increased surface/air contact within section 100. Chilled, dried air 113 exits section 100 into manifold 110 wherein it is conveyed to the opposite side entrance 115 to core 12'.

Air 113 passes downwards in core 12' in counterflow to air 18 and is warmed by heat exchange therewith through the walls of plates 112. Warmed air 47 is collected by manifold 118 and is discharged from system 10' for use.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for drying and tempering flowing air, comprising:
   a) a first heat exchanger for precooling and subsequently reheating said flowing air;
   b) a second heat exchanger for chilling said flowing air below the incoming dew point thereof to remove moisture therefrom;
   c) a moisture removal section disposed between said first and second heat exchangers for removing entrained moisture from said air and for thermally separating said first and second heat exchangers; and
   d) means for providing refrigerant to said second heat exchanger wherein said means for providing refrigerant comprises:
      i) a flashing distributor attached to said second heat exchanger for providing refrigerant to a second side of said second heat exchanger; and
      ii) a collector attached to said second heat exchanger for collecting spent refrigerant from said second side of said second heat exchanger.

2. A system in accordance with claim 1 further comprising refrigerating means for receiving said spent refrigerant, recompressing said refrigerant, and providing compressed refrigerant to said flashing distributor.

3. A system in accordance with claim 1 wherein said flashing distributor comprises:
   a) a body provided with an axial bore for receiving and conveying said refrigerant; and
   b) a plurality of bores intersecting said axial bore for distributing said refrigerant along a plurality of plates in said second heat exchanger, wherein said refrigerant within said axial bore is in a liquid state, and wherein the diameter of said intersecting bores is selected such that at least a portion of said liquid refrigerant is caused to flash to a gaseous state by being passed through said transverse radial bores.

4. A system in accordance with claim 1 further comprising:
   a) a first crossover manifold for conveying said air from said first heat exchanger to a first side of said second heat exchanger;
   b) a sump for collecting moisture from said second heat exchanger and said moisture removal section and for conveying said air from said second heat exchanger to said moisture removal section; and
   c) a second crossover manifold for conveying said air from said moisture removal section to a second side of said first heat exchanger.

5. A system in accordance with claim 4 further comprising:
   a) an inlet manifold for conveying said air to said first side of said first heat exchanger; and
   b) an outlet manifold for conveying said air from said second side of said first heat exchanger.

6. A system in accordance with claim 5 wherein at least one of said first crossover manifold, said second crossover manifold, said sump, said inlet manifold, and said outlet manifold has a cross-sectional profile selected from the group consisting of rectangular and hemi cylindrical.

7. A system for drying and tempering flowing air, comprising:
   a) a first heat exchanger for precooling and subsequently reheating said flowing air;
   b) a second heat exchanger for chilling said flowing air below the incoming dew point thereof to remove moisture therefrom; and
   c) a moisture removal section disposed between said first and second heat exchangers for removing entrained moisture from said air and for thermally separating said first and second heat exchangers;
   wherein said first heat exchanger, said second heat exchanger, and said moisture removal section are each formed of a plurality of parallel plates, and wherein all such plates are mutually parallel.

8. A system in accordance with claim 7 wherein said parallel plates are bounded by first and second end frames.

9. A system in accordance with claim 8 wherein said plates and end frames are joined as by brazing.

10. A system in accordance with claim 9 wherein said brazing is completed in a single step.

11. A system in accordance with claim 5 wherein a path of said flowing air through said system comprises:
   a) a first path portion through said inlet manifold to said first heat exchanger;
   b) a second path portion through a first side of said first heat exchanger;
   c) a third path portion from said first heat exchanger through said first crossover manifold;
   d) a fourth path portion through a first side of said second heat exchanger;
   e) a fifth path portion through said sump;
   f) a sixth path portion through said moisture removal section;
   g) a seventh path portion through said second side of said first heat exchanger; and
   h) an eighth path portion from said first heat exchanger through said outlet manifold.

12. A system in accordance with claim 11 wherein the direction of air flow through said second path portion is in a direction opposite from the direction of air flow through said seventh path portion.

13. A system in accordance with claim 11 wherein the direction of air flow through said second path portion is upwards and the direction of air flow through said seventh path portion is downwards.

14. A system in accordance with claim 11 wherein the direction of air flow through said fourth path portion is in a direction opposite from the direction of refrigerant flow through said second heat exchanger.

15. A system in accordance with claim 11 wherein the direction of air flow through said fourth path portion is downwards and the direction of refrigerant flow through said second heat exchanger is upwards.

16. A system for drying and tempering flowing air, comprising:
   a) a first heat exchanger for precooling and subsequently reheating said flowing air:
   b) a second heat exchanger for chilling said flowing air below the incoming dew point thereof to remove moisture therefrom; and
   c) a moisture removal section disposed between said first and second heat exchangers for removing entrained moisture from said air and for thermally separating said first and second heat exchangers;
   wherein said flowing air is compressed to a super atmospheric pressure prior to treatment by said system.

17. A system for drying and tempering flowing air, comprising:
   a) a first heat exchanger for precooling and subsequently reheating said flowing air;
   b) a second heat exchanger for chilling said flowing air below the incoming dew point thereof to remove moisture therefrom; and
   c) a moisture removal section disposed between said first and second heat exchangers for removing entrained moisture from said air and for thermally separating said first and second heat exchangers;
   wherein air leaving said moisture removal section has a dew point of about 400° F.

18. A system for drying and tempering flowing air, comprising:
   a) a first heat exchanger for precooling and subsequently reheating said flowing air;
   b) a second heat exchanger for chilling said flowing air below the incoming dew point thereof to remove moisture therefrom;
   c) a moisture removal section disposed between said first and second heat exchangers for removing entrained moisture from said air and for thermally separating said first and second heat exchangers; and
   d) an inverted weir disposed in the path of said flowing air between said second heat exchanger and said moisture removal section.

* * * * *